US009271480B2

(12) United States Patent
Black

(10) Patent No.: US 9,271,480 B2
(45) Date of Patent: Mar. 1, 2016

(54) METHOD OF ADDING OR ENHANCING THE UVR CAPABILITY OF NATURAL AND SYNTHETIC FISHING LURE MATERIALS AND THE RESULTING ENHANCED FISHING LURE MATERIALS

(71) Applicant: William J Black, Roseburg, OR (US)

(72) Inventor: William J Black, Roseburg, OR (US)

( * ) Notice: Subject to any disclaimer, the term of this patent is extended or adjusted under 35 U.S.C. 154(b) by 178 days.

(21) Appl. No.: 14/251,613

(22) Filed: Apr. 13, 2014

(65) Prior Publication Data

US 2015/0289490 A1 Oct. 15, 2015

(51) Int. Cl.

*A01K 85/00* (2006.01)
*A01K 85/01* (2006.01)
*B05D 1/18* (2006.01)
*B05D 5/06* (2006.01)

(52) U.S. Cl.

CPC ................ *A01K 85/00* (2013.01); *A01K 85/01* (2013.01); *B05D 1/18* (2013.01); *B05D 5/06* (2013.01); *B05D 5/063* (2013.01)

(58) Field of Classification Search

CPC ......... A01K 85/00; A01K 85/01; B05D 1/18; B05D 5/06; B05D 5/063
See application file for complete search history.

(56) References Cited

U.S. PATENT DOCUMENTS 3,300,325 A * 1/1967 Lindquist ................ C09D 5/30 106/163.01
3,957,675 A * 5/1976 Schutt .................. G02B 5/0891 106/461
4,335,495 A * 6/1982 Buchanan ............. A01K 85/00 156/230
4,776,858 A * 10/1988 Mayer ...................... D06P 3/00 8/517
4,888,907 A * 12/1989 Gibbs .................... A01K 85/16 43/42.06
4,927,643 A * 5/1990 D'Orazio .............. A23K 1/188 426/1
5,077,930 A * 1/1992 Berry ..................... A01K 85/14 43/42.22
5,116,937 A * 5/1992 Greene ................ C08G 63/672 528/272
5,333,405 A * 8/1994 Bowles .................. A01K 85/01 43/42.06
5,409,760 A * 4/1995 Neitz ........................ F41H 3/02 428/195.1
5,465,524 A * 11/1995 Vallone .................. A01K 85/01 43/17.6
5,725,892 A * 3/1998 Gibbs ................ B29C 45/2628 249/55
6,048,554 A * 4/2000 Collins .................. A23K 1/188 426/1
6,207,077 B1 * 3/2001 Burnell-Jones .......... C08J 5/043 252/301.36
6,367,384 B1 * 4/2002 Cass ....................... B41M 1/40 101/41
6,684,557 B1 * 2/2004 Yu ......................... A01K 85/01 250/459.1
7,528,187 B2 5/2009 Jeckle
8,220,379 B2 7/2012 Curry
8,490,321 B1 * 7/2013 Butz ...................... A01K 85/01 43/17.6
2001/0010367 A1 * 8/2001 Burnell-Jones ........ C09K 11/02 252/301.36
2006/0005456 A1 * 1/2006 Harris .................... A01K 91/06 43/42.06
2006/0121166 A1 * 6/2006 Jeckle .................... A01K 85/00 426/395
2007/0199228 A1 * 8/2007 Johnson ................ A01M 31/06 43/3
2007/0200337 A1 * 8/2007 Johnson ................ A01M 31/06 283/91
2007/0212957 A1 * 9/2007 Halliday ................ A41D 13/00 441/80
2009/0000177 A1 * 1/2009 Johnson ................ A01M 31/06 43/17.6
2010/0037509 A1 * 2/2010 Halliday ................ A41D 13/00 43/42.32
2010/0186279 A1 * 7/2010 Groth .................... A01M 31/06 43/2
2010/0269398 A1 * 10/2010 Ware ...................... A01K 85/01 43/17.6
2010/0293833 A1 * 11/2010 Bossone, III .......... A01K 85/01 43/17.6
2012/0055064 A1 * 3/2012 Pringle ................... G01J 3/465 43/2
2014/0223799 A1 * 8/2014 Bossone, III .......... A01K 85/12 43/42.19
2014/0360088 A1 * 12/2014 Hamaguchi ............ A01K 85/16 43/42.32
2015/0264910 A1 * 9/2015 Pfeiffer ................ A01K 97/045 426/1
2015/0289490 A1 * 10/2015 Black ..................... A01K 85/00 427/160

* cited by examiner

*Primary Examiner* — James M Mellott

(57) ABSTRACT

A method of substantially permanently providing or enhancing ultra violet reflectance in materials suitable for use in making fishing lures materials and the resulting fishing lures so provided.

20 Claims, No Drawings

METHOD OF ADDING OR ENHANCING THE UVR CAPABILITY OF NATURAL AND SYNTHETIC FISHING LURE MATERIALS AND THE RESULTING ENHANCED FISHING LURE MATERIALS

BACKGROUND OF THE INVENTION

1. Field of the Invention

The present invention generally relates to a method of adding or enhancing the ultra violet reflectance capability of natural and synthetic fishing lure making materials. More specifically the present invention relates to a method of dyeing natural and synthetic fishing lure materials to provide permanently bonded UVR substances to said natural and synthetic fishing lure materials. Further, the present invention relates to utilizing the instant invention on fishing lure materials that are untreated, pre-color dyed, pre-UV fluorescence dyed, and pre-color and pre-fluorescence dyed. The present invention also relates to said UVR enhanced fishing lure materials so produced.

2. Description of the Related Art

Color is an interpretation of light waves having a particular wavelength. While it is an organism's eye that receives light waves, it is the organism's brain that interprets those light waves and "sees" colors.

A transparent lens called the cornea is at the front of the eye to allow light waves into the eye. Behind the cornea is the iris, which gives the eye its color. By changing size, the iris regulates the amount of light entering the pupil, which is the orifice defined by the iris. Located behind the iris is a crystalline lens which focuses the light rays entering the eye onto the retina. The retina is the inner most layer of the eye and is covered with photo receptor cells. Light waves enter the eye though the cornea, pass through the pupil are focused by the lens and strike the photo receptors on the retina.

There are two types of photo receptors, rods and cones, which are named for their relative shapes. Rod type photo receptors perceive the intensity of light and enable an organism to see at night and other low light conditions. Cone type photo receptors perceive the wavelengths of various light waves and enable the organism to distinguish colors.

Humans are among the minority of mammals that have color vision. In the human eye, rods are found at the peripheral regions of the retina but are nearly absent from the center of the visual field, known as the fovea, where the cones are concentrated. The human eye has about 150,000 cones (color receptors) per square millimeter of fovea area. Humans' eyes have three variants of photo-receptive cones (known as red cones, blue cones, and green cones) and that reason humans are classified as trichromic organisms. Each variant of photo receptive cone carries a unique protein, called an opsin, which reacts when struck by light waves having wavelengths that correspond to the opsin's light sensitivity. It is unknown whether the reaction is physical, chemical, or both. The reaction of the opsins is communicated to the brain allowing the organism to distinguish between red, blue, and green colors. Thus, the world visually perceived by humans is dominated by light having wave lengths ranging from 400-750 nanometers or blue to red respectively.

In contrast to humans, bony fish, birds, and some other mammals have tetra-chromic vision. The eyes of tetra-chromic organisms have four variants of photo receptive cones. In addition to having three variants of cones with opsins sensitive to red, green and blue light, these organisms have a fourth variant of cone with an opsin that is sensitive to ultra violet (UV) light which presumptively enables the organism to perceive ultra violet light that is invisible to humans. The UV range of interest is from about 200-to about 385 nanometers with the peak sensitivity of the opsin on this fourth variant of photo receptive cone is about 358 nanometers which is known as Ultra Violet A (UVA) light.

As noted above, while a human eye has about 150,000 cones per square millimeter of fovea area, the eyes of bony fish and crustaceans, for example, have more than one million cones per square millimeter of fovea area. This large difference is the number of cone type photo receptors in the fovea presumptively provides bony fish and crustaceans with greater visual acuity than humans, as well as an ability to perceive UV light that is invisible to humans.

Ultra violet light penetrates more deeply into water than visible light and ultraviolet light is abundant in near surface marine ecosystems. It is estimated there is sufficient UV light for UV vision down to a depth of approximately 200 meter in clear ocean water, while visible light penetrates clear ocean water to a depth of only approximately 20-40 meters. The current prevailing hypothesis is that UV vision is primarily used by fish and crustaceans to improve detection of prey.

The instant invention reflects UV light off of surfaces created using the ultra violet light reflectance (UVR) using materials of applicant's claimed invention making baits and lures more perceptible to bony fish in particular and theoretically more likely to cause the fish to attempt to eat the so created bait or lure.

For example, U.S. Patent Application Publication Number 2006/0121166 issued Jun. 8, 2006 to Jeckle teaches a spray-on ultra violet light reflective composition for application on natural and synthetic baits and lures used in fishing activities. Said composition made in three separate phases and thereafter combined. When this three phase mixture is sprayed onto a natural or artificial bait or lure it creates a polymeric coating thereon containing said ultra violet light reflective composition. This reference fails to disclose, teach, or fairly suggest the "dyeing" a ultra violet reflective composition substantially permanently to natural and synthetic materials suitable for use in the construction of fishing lures.

U.S. Pat. No. 7,528,187 issued May 5, 2009 to Jeckle teaches a spray-on ultra violet light absorbing composition for application to bird decoys and related bird hunting and bird watching apparatus, said composition absorbing at least a portion of the ultra violet impinging on the article coated therewith to more closely reflect similar amounts of ultra violet light as the surrounding habitat. This reference teaches the polar opposite of applicant's claimed invention in that it is designed to absorb at least of the ultra violet light impinging on it instead of reflecting it. Thus, this reference does not disclose, teach, or fairly suggest applicant's claimed invention.

It is known that many aquatic insects reflect ultra violet light from only portions of their anatomies creating UVR patterns or signatures similarly to the visual color, size, and shape of an aquatic insect for bony fishes to key on during feeding periods. Likewise aquatic insects, such as for example, caddis flies (sedges) reflect practically no UVR from most of their anatomies, and this too may be a feeding key factor to fish.

The prior references instead create a substantially uniform UVR over the complete anatomy of baits and lures covered with them via spray application over the completed baits or lures.

Likewise U.S. Pat. No. 8,220,379 issued Jul. 17, 2012 to Curry teaches composition which may be removably applied to an object or clothing to absorb at least a portion of the ultra violet light impinging on the object so coated by said composition.

This ability to provide UVR in fishing lures increases the length of time during the day when fish can "see" a fishing lure. This is especially true during the early dawn and predawn hours and the twilight hours of the day. Additionally, the ultra violet reflectance tends to mimic the natural fishing foods "light print" thereby increasing the likelihood of a fish taking the fishing lure.

Thus, there remains a need for a composition and method of substantially permanently applying an ultra violet light reflective composition to natural and synthetic fishing lure materials that may also be dyed a color and/or dyed with a fluorescing composition.

DISCLOSURE OF THE INVENTION

The present invention provides advantages and alternatives over the prior art by providing a method of adding or enhancing ultra violet light reflectance (UVR) to both naturally colored and dyed natural and synthetic fishing lure materials.

According to a further aspect of the present invention, provides for a method of adding or enhancing said ultra violet reflectance in undyed fishing lure materials, both natural and synthetic, pre-color dyed natural and synthetic materials, predyed UV fluorescent materials, and materials that have been pre-dyed with both colorants and UV fluorescent materials.

According to yet another aspect of the present invention provides for the lure making materials produced by said method.

According to a yet further aspect of the present invention there is provided a method of utilizing said UVR fishing lure materials as enhancing additives to non-UVR fishing lure materials.

According to still another aspect of the present invention provides for producing fishing lures containing UVR materials in selected portions of said lures, or in all of said lures.

The present invention thus advantageously provides a method for substantially permanently adding UVR capability to both natural and synthetic materials suitable for use in making fishing lures.

DESCRIPTION OF THE PREFERRED EMBODIMENTS OF THE INVENTION

The instant invention provides substantially permanent ultra violet light reflectance properties to natural and synthetic materials suitable for use in the construction of fishing lures. Furthermore, said substantially permanent ultra violet light reflectance properties may be provided to naturally colored materials, colorant dyed materials, fluorescent dyed materials, and colorant and fluorescent dyed materials. Additionally, said substantially permanent ultra violet light reflectance properties may be added to the desired materials simultaneously with colorants, fluorescents, or both. Still further, said instant invention provides for enhancing any UVR capabilities of the materials receiving such UVR enhancement.

The materials suitable for providing the ultra violet reflectance properties include those mineral based and inorganic based materials providing a desired amount of ultra violet reflection of ultra violet light impinging on said mineral based and inorganic based materials. Suitable examples of said mineral based and inorganic based ultra violet reflecting materials include, but are not limited to, water soluble salts of metal and other inorganic elements, such as magnesium carbonate, magnesium oxide, barytes, and calcium carbonate.

Currently preferred ultra violet reflecting (UVR) materials are magnesium oxide and magnesium carbonate.

In one preferred embodiment of the claimed invention the ultra violet reflecting (UVR) materials of the instant invention are substantially permanently applied to the desired materials suitable for use in making fishing lures using dyeing procedures. Namely, the raw lure making materials are cleaned using a cleaning agent in heated water with soaking and stirring. Once clean said raw lure making materials are drained and excess water is removed. Next said cleaned raw lure making materials are introduced into heated water having the required amount of the desired ultra violet reflecting material and the desired amount and type of hydrogen ion supplying material (acid) dissolved in said heated water. The materials are stirred until substantially all of the ultra violet reflecting material has been taken into the lure making materials. Visually, the ultra violet reflecting material once dissolved the heated water bath has a slightly milky or cloudy appearance which disappears once the ultra violet reflecting material has been completely taken up by the lure making materials. The materials are then removed from the heated water and excess water is removed. Finally, the lure making materials now containing the ultra violet reflecting material is air dried. In this embodiment the natural color of the lure making materials is maintained and the ultra violet reflecting material undiscernible to the human eye because it is in a part of the light spectrum the human eye does not see.

This process may be used with both raw natural and synthetic materials. By "raw" is meant that the material has not been colorant dyed or otherwise treated before the UVR materials have been substantially permanently added (dyed) to said materials.

Preferred acids include acetic acid in the form of vinegar or hydrochloric acid sold as muriatic acid, and sulfuric acid sold as automotive battery acid.

Preferred cleaning agents include solutions containing at least ethoxylated and sulfated aliphatic alcohols such as for example, Synthrapol and dish cleaning detergents such as sold under the brand Dawn from Proctor & Gamble.

In another preferred embodiment of the claimed invention raw lure making materials are cleaned using a cleaning agent in heated water with soaking and stirring. Once clean said raw lure making materials are drained and excess water is removed. Next said cleaned raw lure making materials are introduced into heated water having the required amount of the desired ultra violet reflecting material, colorant dye stuffs, and the desired amount and type of hydrogen ion supplying material (acid) dissolved in said heated water. The materials are stirred until substantially all of the ultra violet reflecting material and dye stuffs have been taken into the lure making materials. Visually, the ultra violet reflecting material once dissolved the heated water bath has a slightly milky or cloudy appearance and the dye stuff colors the water both of which disappear once the ultra violet reflecting material and the dye stuff has been completely taken up by the lure making materials. The materials are then removed from the heated water and excess water is removed. Finally, the lure making materials now containing the ultra violet reflecting material and the dye stuff is air dried. In this embodiment the human eye sees the color of the dye stuff and the ultra violet reflecting material does not appear to the human eye because it is in a part of the light spectrum the human eye does not see.

In yet another preferred embodiment of the claimed invention raw lure making materials are cleaned using a cleaning agent in heated water with soaking and stirring. Once clean said raw lure making materials are drained and excess water is removed. Next said cleaned raw lure making materials are introduced into heated water having the required amount of the desired ultra violet reflecting material, UV fluorescing dye stuffs, and the desired amount and type of hydrogen ion supplying material (acid) dissolved in said heated water. The materials are stirred until substantially all of the ultra violet reflecting material and UV fluorescing dye stuffs have been taken into the lure making materials. Visually, the ultra violet reflecting and ultra violet fluorescing materials once dissolved the heated water bath has a slightly milky or cloudy appearance which disappears once the ultra violet reflecting material and the ultra violet fluorescing have been completely taken up by the lure making materials. The materials are then removed from the heated water and excess water is removed. Finally, the lure making materials now containing the ultra violet reflecting material and ultra violet fluorescing material is air dried. In this embodiment the human eye continues to see the UV fluorescing dye stuffs of the lure making materials when exposed to black light and the ultra violet reflecting material does not appear to the human eye because it is in a part of the light spectrum the human eye does not see and it does not fluoresce under black light.

In a further preferred embodiment of the claimed invention natural or synthetic raw materials are cleaned using a cleaning agent in heated water with soaking and stirring. Once clean said lure making materials are drained and excess water is removed. Next said cleaned lure making materials are introduced into heated water having the required amount of the desired ultra violet reflecting material, colorant dye stuffs, UV fluorescing dye stuffs and the desired amount and type of hydrogen ion supplying material dissolved in said heated water. The materials are stirred until substantially all of the ultra violet reflecting material, dye stuffs, and UV fluorescing dye stuffs have been taken into the lure making materials. The materials are then removed from the heated water and excess water is removed. Finally, the lure making materials now containing the ultra violet reflecting material is air dried. In this embodiment the human eye continues to see the color added by the colorant dye stuffs, and the fluorescing colors of the UV fluorescing dye stuffs when said materials are exposed to black light but again the ultra violet reflecting material does not appear to the human eye because it is in a part of the light spectrum the human eye does not see.

In somewhat similar fashion, as set out hereinbelow, said lure making natural and synthetic materials may be previously dyed with colorants, dyed with fluorescent materials, or dyed with both colorant and fluorescent materials prior to having the ultra violet reflecting materials substantially permanently added thereto. Here cleaning is not required before adding the UVR to the lure making materials. Instead these pre-dyed materials are soaked in heated water containing a desired amount of cleaning agent, a desired amount of colorant setting agent such as for example table salt (NaCl), and desired amount and type of hydrogen ion supplying material (acid).

Example 1

A professional saltwater guide in New England and a friend found a pod of feeding stripers. The guide used his own mullet fly pattern using materials having ultra violet reflectance produced by the method of the instant invention. His friend used the same mullet fly pattern tied with the same type of materials without the ultra violet reflectance of the present invention. Otherwise all the tackle and lures were identical and the two fishermen fished side by side. The ultra violet reflectance materials tied fishing fly produced more catch stripers at a ratio of 5:1. This clearly demonstrates the advantages of using materials produced by the instant claimed method.

Example 2

An experienced West Coast steelhead fly fisherman traveled to a fishing lodge on the Great Lakes. Upon arrival he encountered dark tannic colored water with very little visible light spectrum visibility. Due to the water's low visibility no one at the lodge was catching fish. This fisherman then tried using fishing fly lures tied with materials having ultra violet reflectance produced by the instant invention. He started catching fish including catching seven different species during the remainder of his visit. This clearly demonstrates the advantages of using materials produced by the instant invention under low visible light visibility and low water clarity situations.

One particularly preferred embodiment of the present invention provides for a method of substantially permanently providing ultra violet reflectance to fishing lure materials for enhancing the effectiveness of artificial fishing lures made therewith in the catching of fish, comprising: a) preparing said fishing lure material for receiving the ultra violet reflectance composition comprising soaking in heated water optionally containing a cleaning agent; b) preparing an ultra violet reflectance bath comprising heated water, a hydrogen ion supplying composition, and an ultra violet reflectance composition; c) introducing the prepared fishing lure material of step a) into the ultra violet reflectance bath of step b, and allowing the ultra violet reflectance composition to be substantially permanently transferred from said bath to said fishing lure material; d) removing the resulting ultra violet reflectance containing fishing lure material from the bath of step b): e) rinsing and removing excess liquid from and air drying said resulting ultra violet reflectance containing material of step d): thereby producing substantially permanently providing ultra violet reflectance to said fishing lure materials to enhance the effectiveness of artificial fishing lures made therewith in the catching of fish.

Another particularly preferred embodiment of the present invention provides for a method of substantially permanently providing ultra violet reflectance to fishing lure materials previously dyed with colorant for enhancing the effectiveness of artificial fishing lures made therewith in the catching of fish, comprising: a) preparing said fishing lure material for receiving the ultra violet reflectance composition comprising soaking in heated water optionally containing a cleaning agent; b) preparing an ultra violet reflectance bath comprising heated water, a hydrogen ion supplying composition, and an ultra violet reflectance composition; c) introducing the prepared fishing lure material of step a) into the ultra violet reflectance bath of step b, and allowing the ultra violet reflectance composition to be substantially permanently transferred from said bath to said fishing lure material; d) removing the resulting ultra violet reflectance containing fishing lure material from the bath of step b): e) rinsing and removing excess liquid from and air drying said resulting ultra violet reflectance containing material of step d): thereby producing substantially permanently providing ultra violet reflectance to said fishing lure materials to enhance the effectiveness of artificial fishing lures made therewith in the catching of fish.

A further particularly preferred embodiment of the present invention provides for a method of substantially permanently providing ultra violet reflectance to fishing lure materials previously dyed with ultra violet fluorescing dyes for enhancing the effectiveness of artificial fishing lures made therewith in the catching of fish, comprising: a) preparing said fishing lure material for receiving the ultra violet reflectance composition comprising soaking in heated water optionally containing a cleaning agent; b) preparing an ultra violet reflectance bath comprising heated water, a hydrogen ion supplying composition, and an ultra violet reflectance composition; c) introducing the prepared fishing lure material of step a) into the ultra violet reflectance bath of step b, and allowing the ultra violet reflectance composition to be substantially permanently transferred from said bath to said fishing lure material; d) removing the resulting ultra violet reflectance containing fishing lure material from the bath of step b): e) rinsing and removing excess liquid from and air drying said resulting ultra violet reflectance containing material of step d): thereby producing substantially permanently providing ultra violet reflectance to said fishing lure materials to enhance the effectiveness of artificial fishing lures made therewith in the catching of fish.

A yet further particularly preferred embodiment of the present invention provides for a method of substantially permanently providing ultra violet reflectance to fishing lure materials previously dyed with color dyes and ultra violet fluorescing dyes for enhancing the effectiveness of artificial fishing lures made therewith in the catching of fish, comprising: a) preparing said fishing lure material for receiving the ultra violet reflectance composition comprising soaking in heated water optionally containing a cleaning agent; b) preparing an ultra violet reflectance bath comprising heated water, a hydrogen ion supplying composition, and an ultra violet reflectance composition; c) introducing the prepared fishing lure material of step a) into the ultra violet reflectance bath of step b, and allowing the ultra violet reflectance composition to be substantially permanently transferred from said bath to said fishing lure material; d) removing the resulting ultra violet reflectance containing fishing lure material from the bath of step b): e) rinsing and removing excess liquid from and air drying said resulting ultra violet reflectance containing material of step d): thereby producing substantially permanently providing ultra violet reflectance to said fishing lure materials to enhance the effectiveness of artificial fishing lures made therewith in the catching of fish.

Although the preferred embodiments of the present invention has been disclosed, various changes and modifications may be made without departing from the scope of the invention as set forth in the appended claims.

What is claimed is:

1. A method of permanently providing ultra violet reflectance to fishing lure materials for enhancing the effectiveness of artificial fishing lures made therewith in the catching of fish, comprising:

a) preparing said fishing lure material for receiving the ultra violet reflectance composition comprising soaking in heated water optionally containing a cleaning agent;
b) preparing an ultra violet reflectance bath comprising heated water, an acid, and an ultra violet reflectance composition;
c) introducing the prepared fishing lure material of step a) into the ultra violet reflectance bath of step b, and allowing the ultra violet reflectance composition to be permanently transferred from said bath to said fishing lure material;
d) removing the resulting ultra violet reflectance containing fishing lure material from the bath of step b);
e) rinsing and removing excess liquid from and air drying said resulting ultra violet reflectance containing material of step d);

thereby permanently providing ultra violet reflectance to said fishing lure materials to enhance the effectiveness of artificial fishing lures made therewith in the catching of fish.

2. The method of permanently providing ultra violet reflectance to fishing lure materials for enhancing the effectiveness of artificial fishing lures made therewith in the catching of fish as claimed in claim 1 wherein, said hydrogen ion supplying composition is selected from the group comprising acetic acid, hydrochloric acid, and sulfuric acid.

3. The method of permanently providing ultra violet reflectance to fishing lure materials for enhancing the effectiveness of artificial fishing lures made therewith in the catching of fish as claimed in claim 1 wherein, said ultra violet reflectance composition is selected from the group comprising water soluble salts of metal and other inorganic elements.

4. The method of permanently providing ultra violet reflectance to fishing lure materials for enhancing the effectiveness of artificial fishing lures made therewith in the catching of fish as claimed in claim 1 wherein, said ultra violet reflectance composition is selected from the group comprising magnesium carbonate, magnesium oxide, barytes, and calcium carbonate.

5. The method of permanently providing ultra violet reflectance to fishing lure materials for enhancing the effectiveness of artificial fishing lures made therewith in the catching of fish as claimed in claim 1 wherein, said cleaning agent is selected from solutions containing at least ethoxylated and sulfated aliphatic alcohols.

6. A method of permanently providing ultra violet reflectance to fishing lure materials previously dyed with colorant for enhancing the effectiveness of artificial fishing lures made therewith in the catching of fish, comprising:

a) preparing said fishing lure material for receiving the ultra violet reflectance composition comprising soaking in heated water optionally containing a cleaning agent;
b) preparing an ultra violet reflectance bath comprising heated water, an acid, and an ultra violet reflectance composition;
c) introducing the prepared fishing lure material of step a) into the ultra violet reflectance bath of step b, and allowing the ultra violet reflectance composition to be permanently transferred from said bath to said fishing lure material;
d) removing the resulting ultra violet reflectance containing fishing lure material from the bath of step b);
e) rinsing and removing excess liquid from and air drying said resulting ultra violet reflectance containing material of step d);

thereby permanently providing ultra violet reflectance to said fishing lure materials to enhance the effectiveness of artificial fishing lures made therewith in the catching of fish.

7. The method of permanently providing ultra violet reflectance to fishing lure materials for enhancing the effectiveness of artificial fishing lures made therewith in the catching of fish as claimed in claim 6 wherein, said hydrogen ion supplying composition is selected from the group comprising acetic acid, hydrochloric acid, and sulfuric acid.

8. The method of permanently providing ultra violet reflectance to fishing lure materials for enhancing the effectiveness of artificial fishing lures made therewith in the catching of fish as claimed in claim 6 wherein, said ultra violet reflectance composition is selected from the group comprising water soluble salts of metal and other inorganic elements.

9. The method of permanently providing ultra violet reflectance to fishing lure materials for enhancing the effectiveness of artificial fishing lures made therewith in the catching of fish as claimed in claim 6 wherein, said ultra violet reflectance composition is selected from the group comprising magnesium carbonate, magnesium oxide, barytes, and calcium carbonate.

10. The method of permanently providing ultra violet reflectance to fishing lure materials for enhancing the effectiveness of artificial fishing lures made therewith in the catching of fish as claimed in claim 6 wherein, said cleaning agent is selected from solutions containing at least ethoxylated and sulfated aliphatic alcohols.

11. A method of permanently providing ultra violet reflectance to fishing lure materials previously dyed with ultra violet fluorescing dyes for enhancing the effectiveness of artificial fishing lures made therewith in the catching of fish, comprising:

a) preparing said fishing lure material for receiving the ultra violet reflectance composition comprising soaking in heated water optionally containing a cleaning agent;

b) preparing an ultra violet reflectance bath comprising heated water, an acid, and an ultra violet reflectance composition;

c) introducing the prepared fishing lure material of step a) into the ultra violet reflectance bath of step b, and allowing the ultra violet reflectance composition to be permanently transferred from said bath to said fishing lure material;

d) removing the resulting ultra violet reflectance containing fishing lure material from the bath of step b);

e) rinsing and removing excess liquid from and air drying said resulting ultra violet reflectance containing material of step d);

thereby permanently providing ultra violet reflectance to said fishing lure materials to enhance the effectiveness of artificial fishing lures made therewith in the catching of fish.

12. The method of permanently providing ultra violet reflectance to fishing lure materials for enhancing the effectiveness of artificial fishing lures made therewith in the catching of fish as claimed in claim 11 wherein, said hydrogen ion supplying composition is selected from the group comprising acetic acid, hydrochloric acid, and sulfuric acid.

13. The method of permanently providing ultra violet reflectance to fishing lure materials for enhancing the effectiveness of artificial fishing lures made therewith in the catching of fish as claimed in claim 11 wherein, said ultra violet reflectance composition is selected from the group comprising water soluble salts of metal and other inorganic elements.

14. The method of permanently providing ultra violet reflectance to fishing lure materials for enhancing the effectiveness of artificial fishing lures made therewith in the catching of fish as claimed in claim 11 wherein, said ultra violet reflectance composition is selected from the group comprising magnesium carbonate, magnesium oxide, barytes, and calcium carbonate.

15. The method of permanently providing ultra violet reflectance to fishing lure materials for enhancing the effectiveness of artificial fishing lures made therewith in the catching of fish as claimed in claim 11 wherein, said cleaning agent is selected from solutions containing at least ethoxylated and sulfated aliphatic alcohols.

16. A method of permanently providing ultra violet reflectance to fishing lure materials previously dyed with color dyes and ultra violet fluorescing dyes for enhancing the effectiveness of artificial fishing lures made therewith in the catching of fish, comprising:

a) preparing said fishing lure material for receiving the ultra violet reflectance composition comprising soaking in heated water optionally containing a cleaning agent;

b) preparing an ultra violet reflectance bath comprising heated water, an acid, and an ultra violet reflectance composition;

c) introducing the prepared fishing lure material of step a) into the ultra violet reflectance bath of step b, and allowing the ultra violet reflectance composition to be permanently transferred from said bath to said fishing lure material;

d) removing the resulting ultra violet reflectance containing fishing lure material from the bath of step b);

e) rinsing and removing excess liquid from and air drying said resulting ultra violet reflectance containing material of step d);

thereby permanently providing ultra violet reflectance to said fishing lure materials to enhance the effectiveness of artificial fishing lures made therewith in the catching of fish.

17. The method of permanently providing ultra violet reflectance to fishing lure materials for enhancing the effectiveness of artificial fishing lures made therewith in the catching of fish as claimed in claim 16 wherein, said hydrogen ion supplying composition is selected from the group comprising acetic acid, hydrochloric acid, and sulfuric acid.

18. The method of permanently providing ultra violet reflectance to fishing lure materials for enhancing the effectiveness of artificial fishing lures made therewith in the catching of fish as claimed in claim 16 wherein, said ultra violet reflectance composition is selected from the group comprising water soluble salts of metal and other inorganic elements.

19. The method of permanently providing ultra violet reflectance to fishing lure materials for enhancing the effectiveness of artificial fishing lures made therewith in the catching of fish as claimed in claim 16 wherein, said ultra violet reflectance composition is selected from the group comprising magnesium carbonate, magnesium oxide, barytes, and calcium carbonate.

20. The method of permanently providing ultra violet reflectance to fishing lure materials for enhancing the effectiveness of artificial fishing lures made therewith in the catching of fish as claimed in claim 16 wherein, said cleaning agent is selected from solutions containing at least ethoxylated and sulfated aliphatic alcohols.

* * * * *